(12) United States Patent
Lee

(10) Patent No.: US 8,364,209 B1
(45) Date of Patent: Jan. 29, 2013

(54) SMART PHONE WITH WELL-ORGANIZED CYCLING FUNCTIONS

(76) Inventor: Wen-Sung Lee, Taichung (TW)

( * ) Notice: Subject to any disclaimer, the term of this patent is extended or adjusted under 35 U.S.C. 154(b) by 0 days.

(21) Appl. No.: 13/248,039

(22) Filed: Sep. 29, 2011

(51) Int. Cl.
*H04B 1/38* (2006.01)

(52) U.S. Cl. .................. 455/566; 715/702; 715/716

(58) Field of Classification Search ....... 455/413–414.4, 455/418, 550.1, 556.1–557, 566–569.2, 575.1–575.9
See application file for complete search history.

(56) References Cited

U.S. PATENT DOCUMENTS

| | | | |
|---|---|---|---|
| 2002/0113185 A1* | 8/2002 | Ziegler | 248/309.1 |
| 2008/0155416 A1* | 6/2008 | Oitaira | 715/716 |
| 2010/0241958 A1* | 9/2010 | Fish | 715/702 |
| 2010/0306705 A1* | 12/2010 | Nilsson | 715/835 |

OTHER PUBLICATIONS

Car Home for Android Gets Personal—Official Google Mobile Blog—http://googlemobile.blogspot.com/2010/10/car-home-for-android-gets-personal.html—Oct. 1, 2010.*
LAPSTOP—Android Apps on Google Play—https://play.google.com/store/apps/details?id=com.werk4.lapstop&feature=search_result—Feb. 25, 2010.*

* cited by examiner

*Primary Examiner* — Kashif Siddiqui

(57) ABSTRACT

A smart phone with the well-organized cycling functions includes a cell phone having a phone device, a GPS device, a stopwatch device and a music device. The devices respectively have a phone control unit, a GPS control unit, a stopwatch control unit and a music control unit. The cell phone further has a riding interface for displaying a phone interface entry, a GPS interface entry, a stopwatch interface entry and a music interface entry. A first phone interface, a first GPS interface, a first stopwatch interface and a first music interface are respectively accessed via the interface entries and are respectively controlling the control units of the devices for displaying the operations or the functions of the devices. Therefore, the smart phone with the well-organized cycling functions organizes the cycling functions of the cell phone for user-friendly displaying.

8 Claims, 6 Drawing Sheets

SMART PHONE WITH WELL-ORGANIZED CYCLING FUNCTIONS

BACKGROUND OF THE INVENTION

1. Field of the Invention

The present invention relates to a smart phone, and more particularly to a smart phone with well-organized cycling functions.

2. Description of Related Art

Bicycle activity is more and more popular in the 21st century because bicycle activity is eco-friendly, convenient and entertaining. Many enterprises encourage their employees to go to work by bicycles instead of driving vehicles today. Many people also go shopping or go traveling by bicycles during their leisure time. Therefore, the current map, the speed meter, the music player and even the calorie calculator become the important cycling tools within a conventional smart phone for a rider cycling.

However, the conventional smart phone has two shortcomings within its organization as following:

First, when a rider is riding, the rider cannot operate the interfaces on the conventional smart phone to use the cycling functions for a long time because it is dangerous.

Second, when a rider is riding and the conventional smart phone is under bicycle riding functions, the rider often misses the current phone call.

Thus, how to organize the cycling functions of the conventional smart phone is an important issue.

The present invention has arisen to mitigate and/or obviate the disadvantages of the conventional. Further benefits and advantages of the present invention will become apparent after a careful reading of the detailed description with appropriate reference to the accompanying drawings.

SUMMARY OF THE INVENTION

The main objective of the present invention is to provide an improved smart phone.

To achieve the objective, a smart phone with well-organized cycling functions comprises a cell phone having a phone device, a GPS device and a stopwatch device, the phone device, the GPS device and the stopwatch device respectively having a phone control unit, a GPS control unit and a stopwatch control unit, the cell phone further comprising a riding interface, the riding interface displaying a phone interface entry, a GPS interface entry and a stopwatch interface entry, a first phone interface, a first GPS interface and a first stopwatch interface respectively accessed via the interface entries, the first interfaces respectively controlling the control units of the devices for displaying the operations or the functions of the devices, a second phone interface, a second GPS interface and a second stopwatch interface respectively accessed via the first interfaces so that a rider uses the smart phone with the well-organized cycling functions conveniently during riding.

Wherein the rider changes one of the first interfaces to another first interfaces by sliding or touching the interfaces with the finger thereof; a lock mode is mounted in the at least one first interface for locking or unlocking the first interfaces; a frame is provided for holding the cell phone during riding; a connector is connected between one side of the frame and a handlebar of a bicycle so that the frame is connected to the handlebar of the bicycle via the connector; a plurality of clamps is mounted on another side of the frame for positioning the cell phone; the cell phone has a music device; the music device further has a music control unit; the riding interface displays a music interface entry; a first music interface is accessed via the music interface entry; a second music interface is accessed via the first music interface; the lock mode is mounted in the first music interface; at least one of the first interfaces has a voice adjuster being in response to the cell phone so that the current voice under each first interfaces is adjusted directly via the corresponding voice adjuster; a phone interface switch, a GPS interface switch, a stopwatch interface switch and a music interface switch are respectively displayed on the upside or the lower side of the first interfaces and each size of the switches is smaller than each size of the first interfaces so that the rider changes one of the first interfaces to another first interfaces directly and conveniently via the switches; the stopwatch control unit of the stopwatch device is in response to the GPS control unit of the GPS device, so that the stopwatch device gets the database from the GPS device and translates the database from the GPS device into the database of the stopwatch device.

Further benefits and advantages of the present invention will become apparent after a careful reading of the detailed description with appropriate reference to the accompanying drawings.

DETAILED DESCRIPTION OF THE INVENTION

Figure 1:
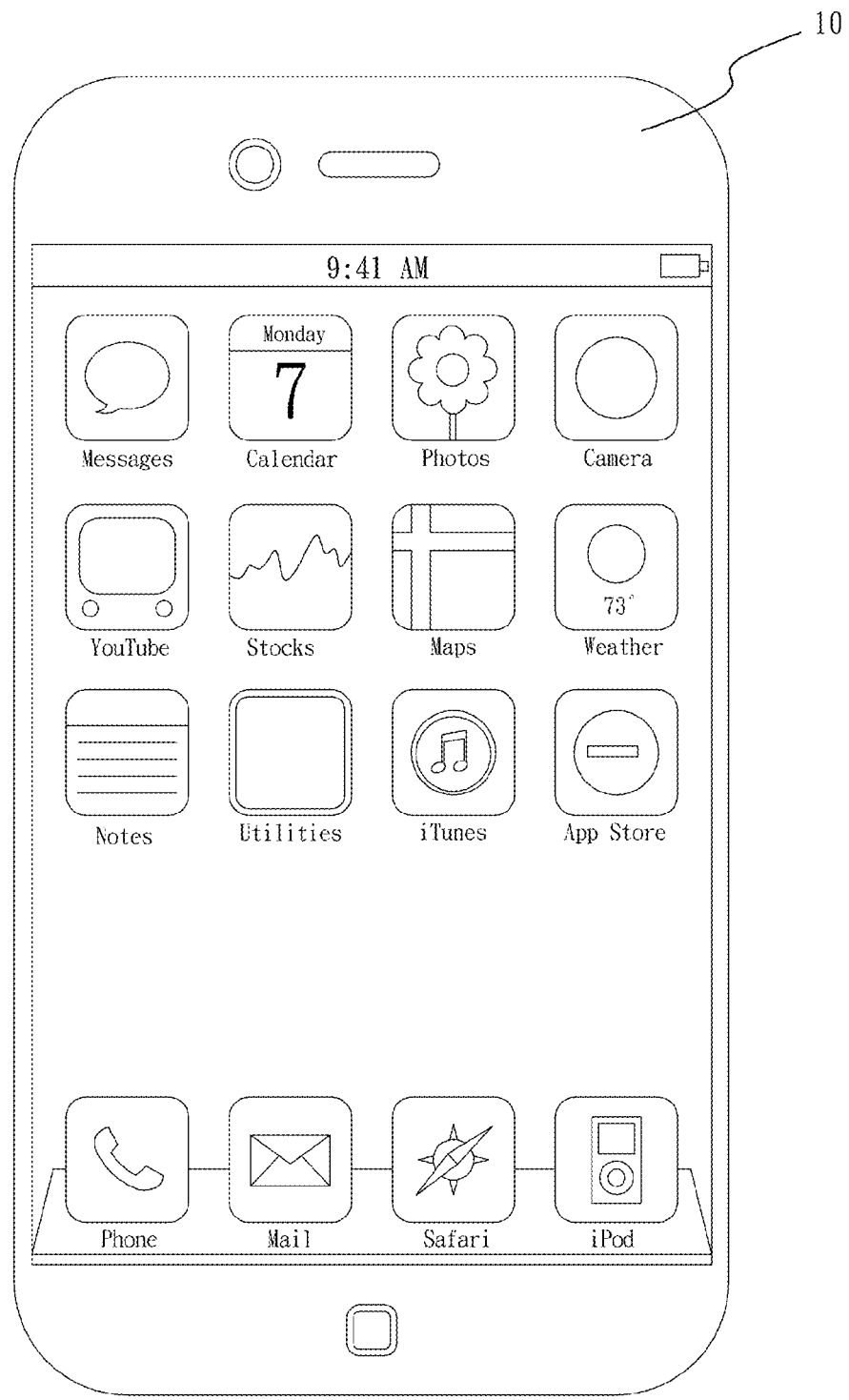
FIG. 1 is a perspective view of a smart phone with the well-organized cycling functions of the present invention.
Figure 2:
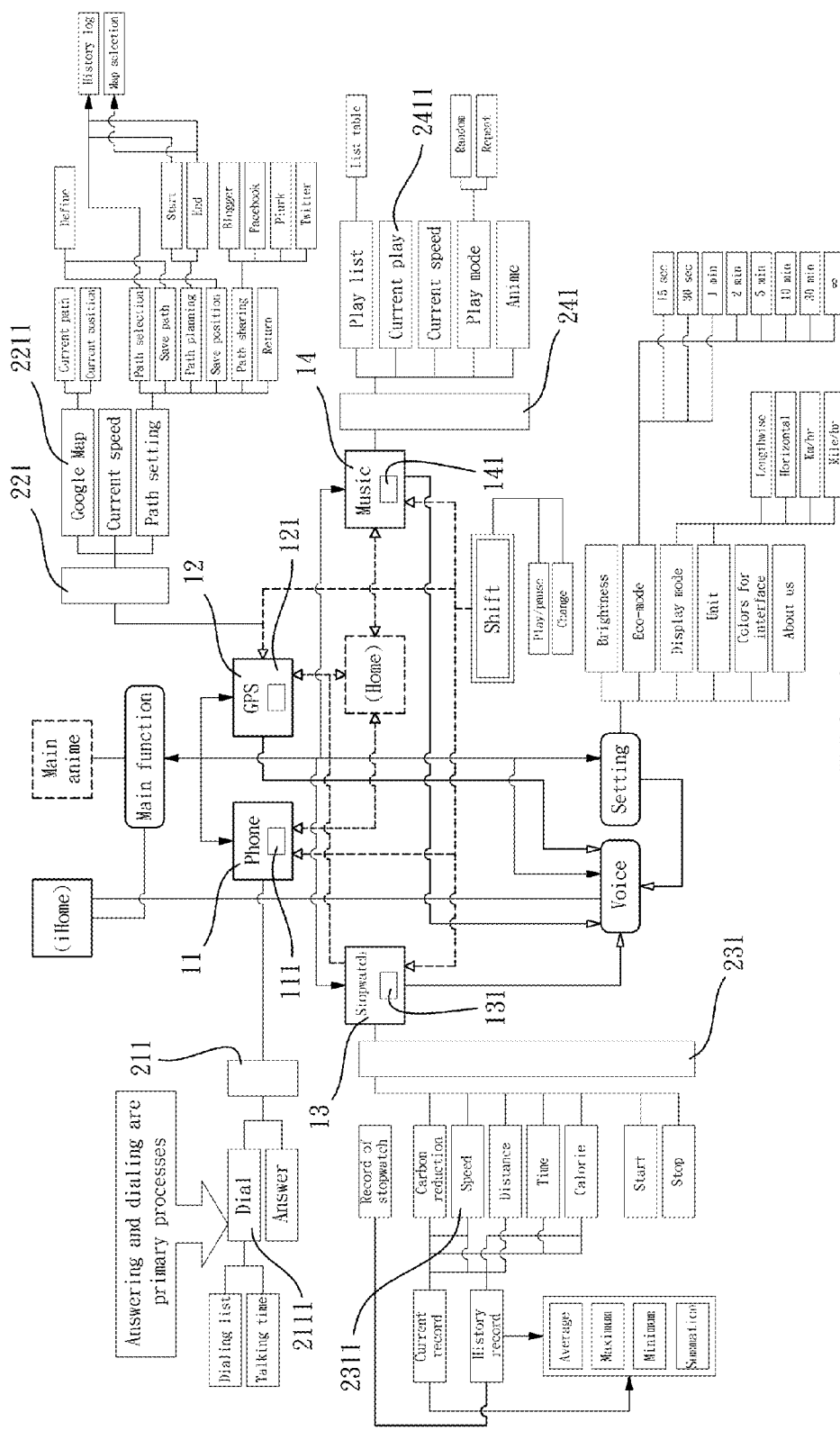
FIG. 2 is a flow chart for showing the functions of the smart phone with the well-organized cycling functions.
Figure 3:
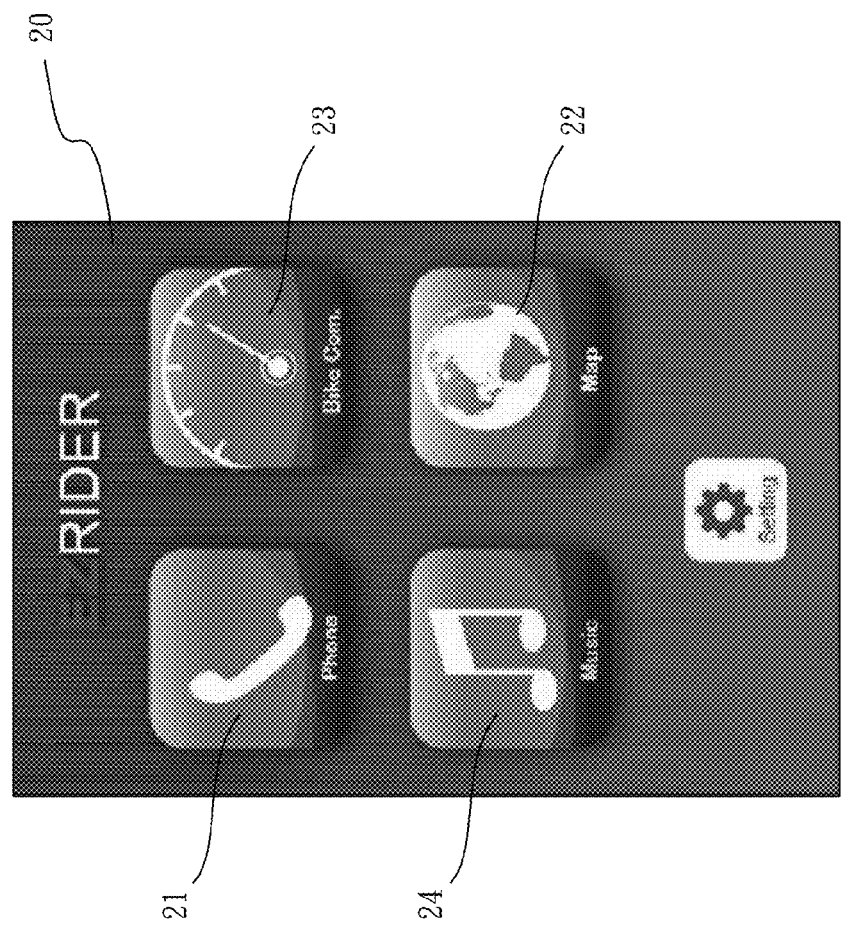
FIG. 3 is a perspective view of a riding interface.
Figure 5:
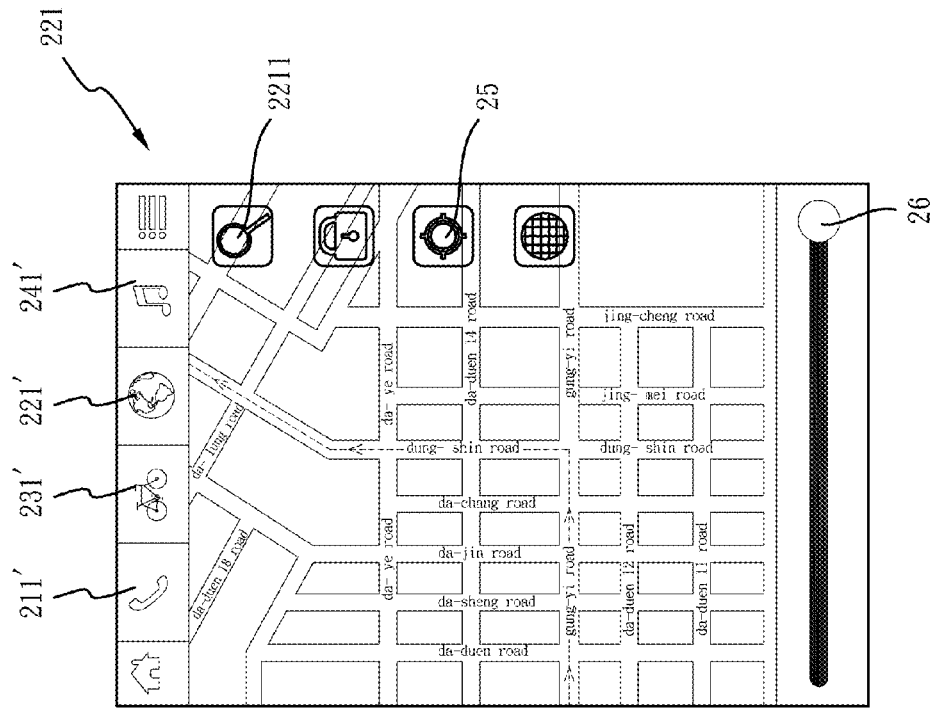
FIG. 5 is a perspective view of a first GPS interface.
Figure 4:
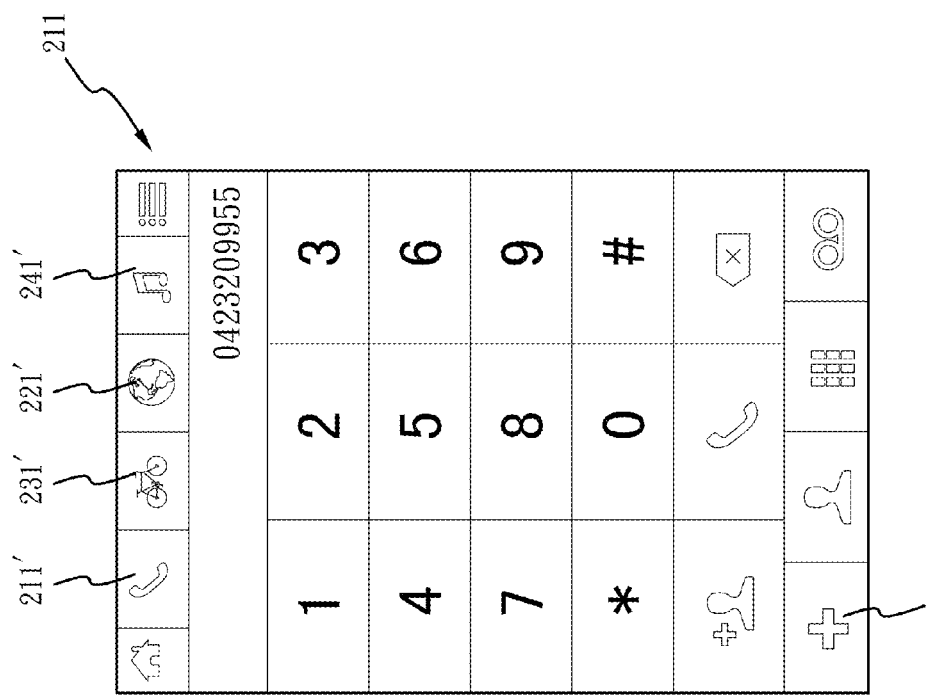
FIG. 4 is a perspective view of a first phone interface.
Figure 7:
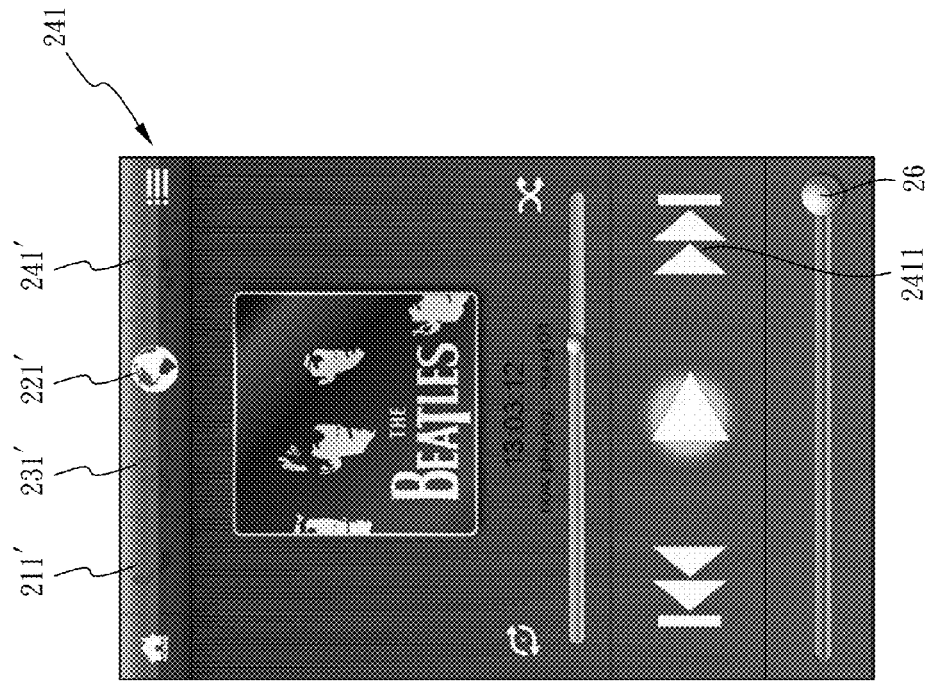
FIG. 7 is a perspective view of a first music interface.
Figure 6:
FIG. 6 is a perspective view of a first stopwatch interface.

Referring to FIGS. 1-7, a smart phone with the well-organized cycling functions in accordance with the present invention comprises a cell phone 10. The cell phone 10 has a phone device 11, a GPS device 12, a stopwatch device 13 and a music device 14. The phone device 11, the GPS device 12, the stopwatch device 13 and the music device 14 respectively have a phone control unit 111, a GPS control unit 121, a stopwatch control unit 131 and a music control unit 141. These control units 111, 121, 131, 141 respectively have the corresponding software (the software is popular for the conventional smart phone and not further described). Referring to FIG. 3, the cell phone 10 further comprises a riding interface 20 for cycling. The riding interface 20 displays a phone interface entry 21, a GPS interface entry 22, a stopwatch interface entry 23 and a music interface entry 24. A first phone interface 211, a first GPS interface 221, a first stopwatch interface 231 and a first music interface 241 are respectively accessed via the interface entries 21, 22, 23, 24. The first interfaces 211, 221, 231, 241 are respectively controlling the control units 111, 121, 131, 141 of the devices 11, 12, 13, 14 and displaying the operations or the functions of the devices 11, 12, 13, 14. The operations or the functions of the devices 11, 12, 13, 14 are shown in FIG. 2, such as the first phone interface 211 has answer function and dial function; the first GPS interface 221 has GOOGLE MAP and speed meter; the first stopwatch interface 231 has carbon reduction meter and speed meter; the first music interface 241 has media player. A second phone interface 2111, a second GPS interface 2211, a second stopwatch interface 2311 and a second music interface 2411 are respectively accessed via the first interfaces 211, 221, 231, 241. The second interfaces 2111, 2211, 2311, 2411 are shown in FIG. 2 such as the first phone interface 211 displays dialing list and talking time under the second phone interface 2111; the first GPS interface 221 displays current path and current position from GOOGLE MAP under the second GPS interface 2211; the first stopwatch interface 231 displays average and maximum carbon reduction under the second stopwatch interface 2311; the first music interface 241 displays list table under the second music interface 2411.

Furthermore, the stopwatch control unit 131 of the stopwatch device 13 is in response to the GPS control unit 121 of the GPS device 12, so that the stopwatch device 13 gets the database of the GPS device 12 and translates the database from the GPS device 12 into the database of the stopwatch device 13, thereafter, the database of the stopwatch device 13 translated from the GPS device 12 is displayed on the first stopwatch interface 231 or on the second stopwatch interface 2311 of the stopwatch device 13. A lock mode 25 is mounted in the at least one first interface 211, 221, 231, 241 (the lock mode 25 is mounted in the first GPS interface 221 of the embodiment of the present invention) for locking or unlocking the first interfaces 211, 221, 231, 241. When the lock mode 25 is under unlocking, one of the first interfaces 211, 221, 231, 241 can be changed to another first interfaces 211, 221, 231, 241 and the second interfaces 2111, 2211, 2311, 2411 cannot be opened, so that the rider changes one of the first interfaces 211, 221, 231, 241 to another first interfaces 211, 221, 231, 241 directly and conveniently during riding rather than returning to the riding interface 20 and opening another first interfaces 211, 221, 231, 241 inconveniently during riding; when the lock mode 25 is under locking, one of the first interfaces 211, 221, 231, 241 cannot be changed to another first interfaces 211, 221, 231, 241 and the second interfaces 2111, 2211, 2311, 2411 can be accessed, so that the cell phone 10 is locked in one of the second interfaces 2111, 2211, 2311, 2411 which the rider wants. The rider changes one of the first interfaces 211, 221, 231, 241 to another first interfaces 211, 221, 231, 241 by sliding or touching these interfaces with the finger. A phone interface switch 211', a GPS interface switch 221', a stopwatch interface switch 231' and a music interface switch 241' are respectively displayed on the upside or the lower side of the first interfaces 211, 221, 231, 241 and each size of the switches 211', 221', 231', 241' is smaller than each size of the first interfaces 211, 221, 231, 241 so that the rider changes one of the first interfaces 211, 221, 231, 241 to another first interfaces 211, 221, 231, 241 directly and conveniently via the switches 211', 221', 231', 241'. The first interfaces 211, 221, 231, 241 respectively have a voice adjuster 26. The voice adjuster 26 is in response to the cell phone 10. The current voice under each first interfaces 211, 221, 231, 241 is adjusted via the corresponding voice adjuster 26 so that the rider adjusts the current voice under each first interfaces 211, 221, 231, 241 directly rather than further opening the second interfaces 2111, 2211, 2311, 2411 and adjusting the current voice inconveniently. Therefore, the smart phone with the well-organized cycling functions organizes the cycling functions of the cell phone 10 for user-friendly displaying.

Figure 8:
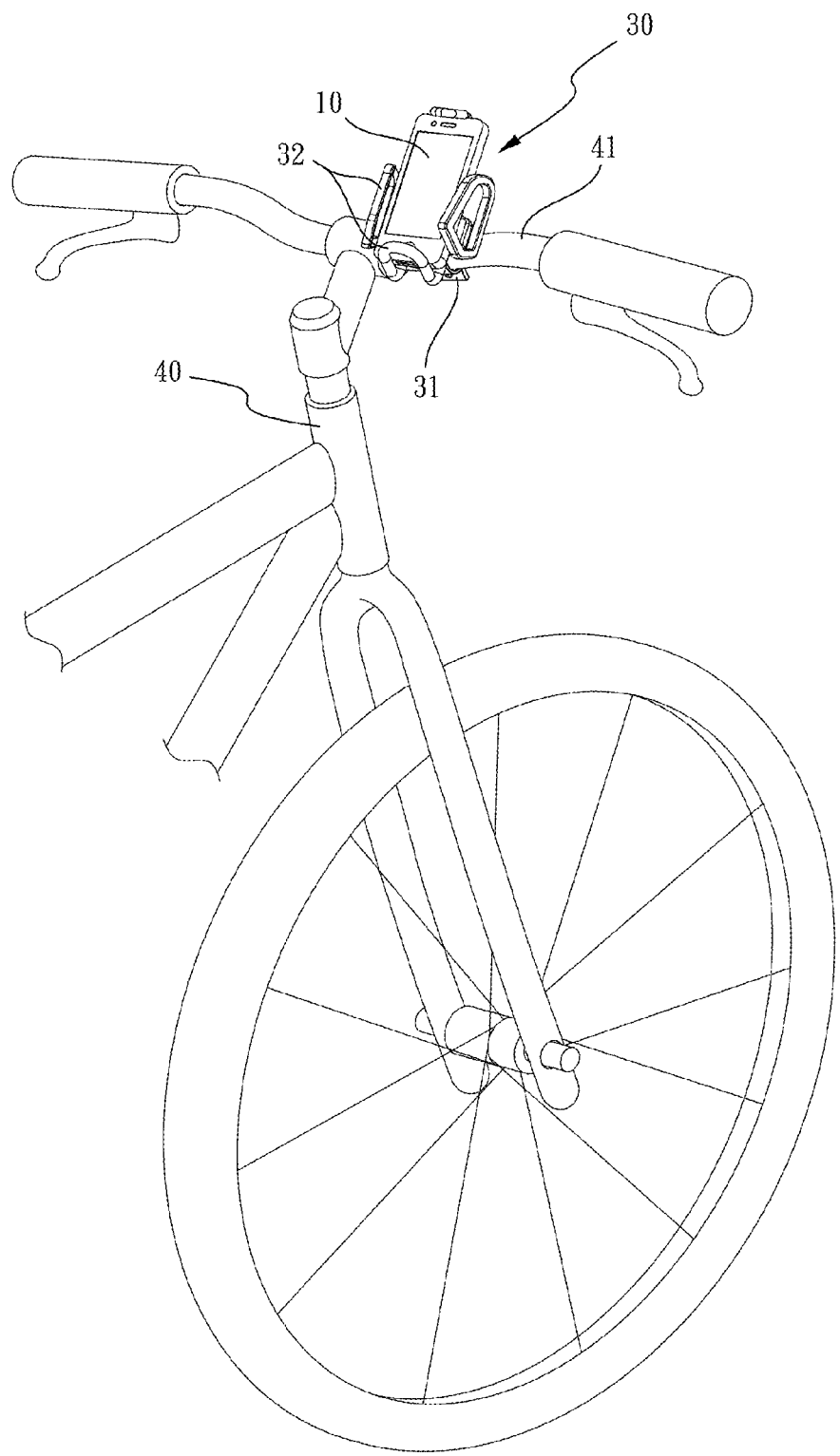
FIG. 8 is an assembled view for showing the smart phone with the well-organized cycling functions being set up on a bike.

Referring to FIG. 8, a frame 30 is provided for holding the cell phone 10 during riding. A connector 31 is connected between one side of the frame 30 and a handlebar 41 of a bicycle 40 so that the frame 30 is connected to the handlebar 41 of the bicycle 40 via the connector 31. A plurality of clamps 32 is mounted on another side of the frame 30 for positioning the cell phone 10.

Although the invention has been explained in relation to its preferred embodiment, it is to be understood that many other possible modifications and variations can be made without departing from the spirit and scope of the invention as hereinafter claimed.

What is claimed is:

1. A smart phone with well-organized cycling functions comprising:
    a cell phone having a phone device, a GPS device and a stopwatch device, the phone device, the GPS device and the stopwatch device respectively having a phone control unit, a GPS control unit and a stopwatch control unit, the cell phone further comprising a riding interface;
    the riding interface displaying a phone interface entry, a GPS interface entry and a stopwatch interface entry, a first phone interface, a first GPS interface and a first stopwatch interface respectively accessed via the interface entries, the first interfaces respectively controlling the control units of the devices for displaying the operations or the functions of the devices;
    a phone interface switch, a GPS interface switch, a stopwatch interface switch and a music interface switch are respectively displayed on the upside or the lower side of the first interfaces and each size of the switches is smaller than each size of the first interfaces so that the rider changes one of the first interfaces to another first interfaces directly and conveniently via the switches; and
    a second phone interface, a second GPS interface and a second stopwatch interface respectively accessed via the first interfaces so that a rider uses the smart phone with the well-organized cycling functions conveniently during riding.

2. The smart phone with the well-organized cycling functions as claimed in claim 1, wherein the rider changes one of the first interfaces to another first interfaces by sliding or touching the interfaces with the finger thereof.

3. The smart phone with the well-organized cycling functions as claimed in claim 1, wherein a lock mode is mounted in the at least one first interface for locking or unlocking the first interfaces.

4. The smart phone with the well-organized cycling functions as claimed in claim 1, wherein a frame is provided for holding the cell phone during riding; a connector is connected between one side of the frame and a handlebar of a bicycle so that the frame is connected to the handlebar of the bicycle via the connector; a plurality of clamps is mounted on another side of the frame for positioning the cell phone.

5. The smart phone with the well-organized cycling functions as claimed in claim 1, wherein the cell phone has a music device; the music device further has a music control unit; the riding interface displays a music interface entry; a first music interface is accessed via the music interface entry.

6. The smart phone with the well-organized cycling functions as claimed in claim 5, wherein a second music interface is accessed via the first music interface; the lock mode is mounted in the first music interface.

7. The smart phone with the well-organized cycling functions as claimed in claim 1, wherein at least one of the first interfaces has a voice adjuster being in response to the cell phone so that the current voice under each first interfaces is adjusted directly via the corresponding voice adjuster.

8. The smart phone with the well-organized cycling functions as claimed in claim 1, wherein the stopwatch control unit of the stopwatch device is in response to the GPS control unit of the GPS device, so that the stopwatch device gets the database from the GPS device and translates the database from the GPS device into the database of the stopwatch device.

* * * * *